(No Model.)
H. A. HARVEY.
RESILIENT SPIRAL WASHER AND MAKING OF THE SAME.
No. 464,301. Patented Dec. 1, 1891.
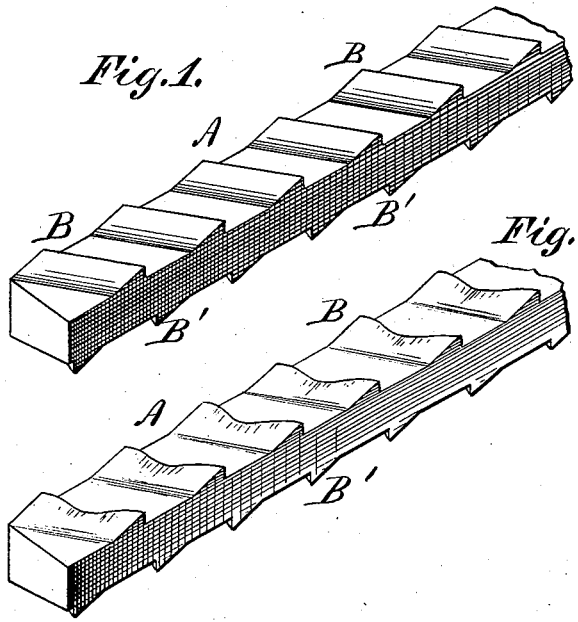

UNITED STATES PATENT OFFICE.

HAYWARD A. HARVEY, OF ORANGE, NEW JERSEY.

RESILIENT SPIRAL WASHER AND MAKING OF THE SAME.

SPECIFICATION forming part of Letters Patent No. 464,301, dated December 1, 1891.

Application filed September 16, 1891. Serial No. 405,886. (No model.)

*To all whom it may concern:*

Be it known that I, HAYWARD A. HARVEY, of Orange, New Jersey, have invented certain Improvements in Resilient Spiral Washers and in the Art of Manufacturing the Same, of which the following is a specification.

This invention embraces a resilient spiral washer the peculiarity of which is that it is provided with ratchet-shaped teeth which may or may not be notched and which extend at intervals across either or both of its faces in directions which are approximately tangential to a circle of nearly the same diameter as the inside diameter of the spiral.

The invention also embraces the method of manufacturing such washers, which consists in first rolling the rod of which the washers are to be made in rolls, the last pass of which is adapted to form teeth of the desired shape, extending at intervals diagonally across one or both sides of the rod; secondly, in so winding the rod spirally that when its convolutions are severed from each other to form washers the teeth will be presented upon one face or upon both faces of each washer, as the case may be, and, finally, in hardening and tempering the washers in the usual manner.

The accompanying drawings illustrating the invention are as follows.

Figure 1 is an isometrical perspective of a portion of a quadrangular bar of steel having formed diagonally across two of its sides series of ratchet-shaped teeth. Fig. 2 is an isometrical perspective of a portion of a bar, illustrating a modification in which the middle portion of each diagonal tooth is hollowed out, thus leaving two pointed teeth, respectively, at the opposite edges of the bar. Fig. 3 is an elevation of a spiral washer made from a quadrangular bar like that represented in Fig. 1. Fig. 4 is a face view of the washer represented in elevation in Fig. 3. Fig. 5 is a longitudinal section of a bolt and nut, showing the application of the washer.

The washer $a$ represented in the drawings is composed of a single convolution of a spiral of suitable pitch, provided with a series $b$ of ratchet-shaped teeth upon that one of its faces intended for impact against the nut $c$, and with a similar series $b'$ of ratchet-shaped teeth upon that one of its faces intended for impact against the object $d$, through which the bolt $e$ is inserted. The teeth are originally formed in the final pass of the rolls which roll the rod A of which the washers are to be made. As will be seen on referring to Fig. 1, the teeth are at first straight and extend diagonally across the rod. When two series of teeth are employed, the diagonal direction of the series B upon one face of the rod A is opposite the diagonal direction of the series B' upon the other face of the rod A. The effect of winding the bar A is to upset the metal upon the concave side and to elongate it upon the convex side. This transforms the straight ratchet or chisel shaped teeth originally formed upon the bar A into the curved ratchet or gouge shaped teeth represented in Fig. 4.

In use the nut when being screwed home draws from the heels toward the apices of the teeth and compresses all parts of the spiral washer into the same plane. The unscrewing of the nut is resisted by the apices of the teeth, which, by the resilience of the washer, are given a tendency to forcibly impinge the face of the washer with which they are in contact. As the unscrewing operation continues, the teeth $b$, owing to their tangential position, deliver a drawing cut upon the face of the nut. Similarly, if the washer partakes of the unscrewing rotary movement of the nut, the teeth $b'$ tend to impinge into and deliver a drawing cut upon the face of the object $d$, through which the bolt is inserted. These tendencies effectually prevent the nut from being jarred loose after it has been screwed home upon the washer.

While it is to be understood that the invention is present if either face of the washer is provided with the described teeth, it is preferred to provide the described teeth upon both faces of the washer. It is also to be understood that while the teeth may be hollowed out or notched, as illustrated in Fig. 2, without departing from the invention, it is preferred to make them of uniform height from end to end, as illustrated in the other figures.

What is claimed as the invention is—

1. A resilient spiral washer provided with ratchet-shaped teeth extending at intervals across one or both of its faces in directions approximately tangential to a circle of nearly the same diameter as the inside diameter of the spiral.

2. The method of manufacturing the herein-described spiral washer, which consists in rolling diagonal ratchet-shaped teeth upon the rod from which the washers are to be made, and then winding the rod spirally, as set forth, and severing, hardening, and tempering the convolutions of the spiral in the usual manner.

HAYWARD A. HARVEY.

Witnesses:
 E. GATTERER,
 M. L. ADAMS.